3,111,409
ANTI-STALING INGREDIENTS FOR BAKED FOOD PRODUCTS AND PROCESS FOR IMPROVING THE TEXTURE AND FRESHNESS RETENTION OF BAKED FOOD PRODUCTS
George R. Jackson and James M. Livingston, Louisville, Ky., assignors, by mesne assignments, to Top-Scor Products Corporation, Inc., Kansas City, Kans., a corporation of Kansas
No Drawing. Filed Mar. 2, 1961, Ser. No. 92,757
6 Claims. (Cl. 99—91)

This invention pertains to improvements in texture and in freshness retention of bread, rolls, cakes and similar baked food products which contain shortening. Inasmuch as the ability of a loaf of bread to retain its freshness is a very essential quality characteristic, much attention has been accorded controllable factors influencing staling. This invention is concerned with such factors and in particular to changes in formulas and baking methods used in the baking industry.

During staling, bread loses its plastic properties, becomes tough and crumbly or hard with a noticeable lack of flavor. Since as bread becomes stale it is harder and feels drier, people are inclined to believe that staling is due to moisture drying out of the loaf. However, studies of relative vapor pressures and water content have been made using fresh and stale bread. Such studies show that differences in water binding by the fresh and stale bread are so small as to be insignificant. It has also been shown that only a small amount of water is lost in the baking process. In fact stale bread can be brought back to a state of temporary freshness by reheating a few minutes in an oven. Thus loss of moisture is not the factor causing staleness.

Even though it is known that the structural changes of staling are not due to a significant decrease in amount of water, it has been shown that if fresh bread is dried quickly to a low moisture content, the structural evidences of staling fail to develop, or do so at a much slower rate. This indicates that during staling some change in structure is developed in bread which involves water in some way. The change in structure during the staling process must, therefore, be due to the formation of some type of cross linkage in the nonaqueous constituent of the bread. Water of fresh bread acts as a plasticizer; that is, it serves as a fluid medium in which motion of solid particles past one another can take place. Apparently, during staling, the water becomes bound to the solid phase and thereby loses its ability to act as a plasticizing medium. This would involve the formation of cross linkages between the non-water elements of the bread.

As a result of these moisture studies, it was important to determine which component of the flour is responsible for the change in binding of water. Since the three most abundant ingredients in flour are carbohydrates, proteins and water, crystallinity, which occurs during the staling process, must be attributable to either the protein or carbohydrates component of the flour. Protein in wheat flour is primarily gluten which gives the dough its tough plastic and rubbery character. The principal carbohydrate on the other hand is starch. Starch is polymeric carbohydrate. The repeating units, which are glucose, form two separate fractions, a linear component with alpha-1,4 linkages referred to as the amylose component and a branched chain component with alpha-1,6 linkages in addition to the alpha-1,4 linkages, this branched chain component being the amylopectin fraction.

Findings made on wheat starch and gluten at moisture contents comparable to those found in bread have been obtained and these show a marked difference between starch and the pure gluten. Starch gels reproduce quantitatively the staling phenomenon in bread, not only in their firming but also in their refreshening behavior on reheating. Gluten gels, on the other hand, show only relatively slight firming with age, and exhibit no refreshening on reheating. Such observations substantiate the general belief that the firming of bread is due mainly to the starch component. The results with starch indicate that the difference in the moisture-binding capacity of stale and fresh bread may be due, at least in part, to the retrogradation of the starch in the bread. Observations show, in fact, that process similar to staling occurs in the retrogradation of starches. An increase in water binding suggests the possibility that the cross linkages formed actually occur through a water molecule as a part of a bridge or bond between a starch component. The branched nature of amylopectin component of starch would tend to prevent it from forming as great a number of cross linkages per unit weight as would the straight-chained amylose component. It was reasoned therefore, that amylose would form a greater number of cross linkages during retrogradation than would whole starch. The fact that straight-chained amylose acquires during retrogradation a somewhat higher percentage increase in moisture-binding capacity than whole starch substantiates this point of view.

While mechanisms may be involved in bread staling other than the firming of the starch fraction, the crystallinity attributable to starch is the major cause of staling. The observation that a similar process occurs in the retrogradation of starches, and particularly amylose, is considered to indicate that these elements are responsible for the structural evidences of staling in bread.

This invention is based on the discovery that molecularly distilled monoglycerides react in some way with the starch component of the flour greatly to retard the rate of bread staling. It may be that the monoglyceride prevents aggregation of the amylopectin or B-fraction of the starch. However, in view of the branched structure of the amylopectin fraction the distilled monoglyceride is believed to react primarily with the amylose or A-fraction of the starch. It has also been found that the molecularly distilled monoglyceride must be provided in a form that will permit its reaction with the amylose component. Commercial monoglycerides have been blended in shortening to be used in bread making and also have been added directly to the dough batch. However, as Alton E. Bailey in Industrial Oil and Fat Products (Second Edition) points out (page 399), commercial monoglycerides are actually a mixture of mono, di and triglycerides. Moreover, even commercial monoglycerides employed in bread making have been incorporated in the dough in combination with the shortening.

By the practice of this invention, however, it has been found that diglycerides and fats have an inhibiting effect on the staling retarding property of the pure monoglyceride. It has been discovered that molecularly distilled monoglycerides must therefore be permitted to contact the starch before it comes in contact with the fats or shortening, that is, the shortening must be used at a non-interfering stage. It has also been found that if molecularly distilled monoglycerides are incorporated per se in the dough, they have no effect on the resulting product. Monoglycerides must, therefore, be provided in a form permitting their reaction in the system. Hence, in accordance with this invention, there is provided as an anti-staling ingredient for baked food products which contain shortening, for incorporation in the dough, a semi-liquid aqueous emulsion of a molecularly distilled edible monoglyceride, the emulsion being devoid of fat and other emulsifying agents and containing 15 to 60 percent molecularly distilled monoglyceride in combination with 85 to 40 percent water. The anti-stalling ingredient of this invention, thus, is a composition having the physical properties of cold cream, this semi-liquid consistency permitting it to be readily mixed with flour.

Whereas it has been difficult to make aqueous emulsions of molecularly distilled monoglycerides as pointed out in U.S. 2,932,574, without either preparing compositions containing only up to 5 percent monoglyceride in water or using a salt such as calcium propionate in an amount undesirably large for baked goods, it has been found that compositions containing 15 to 60 percent molecularly distilled monoglycerides can be made. These compositions are made by the application of carefully controlled heating and cooling techniques. The molecularly distilled monoglyceride is gradually heated to about 148° F., being careful to avoid localized overheating. If the temperature exceeds about 155° F., the molecularly distilled monoglyceride will gel. Accordingly, the molecularly distilled monoglyceride-water mixture is carefully heated to 148° F. to 155° F. to bring the monoglyceride into a smooth, creamy dispersion. It has also been found that if the mixture thus heated is merely allowed to cool, the dispersion will probably break. Hence, to form the emulsion the heated dispersion must be gradually cooled with continuous stirring, or more vigorous agitation, until the temperature drops to 90° F. Preferably, the mixture is stirred or homogenized until it cools to room temperature or lower. As indicated, the final composition is a paste, that is a semi-liquid emulsion. In this form, it immediately enters the water phase to contact the starch fractions. In general, the emulsion composition is added to the water which is added to the flour. However, it can be added to the flour before the water is added. While it is not necessary, the semi-liquid emulsion can, of course, contain a preservative such as propionic, acetic or sorbic acid or an edible salt thereof, for instance, a sodium, potassium or calcium salt in an amount less than 1 percent based on the emulsion for the purpose of inhibiting mold growth. This preservative can be added during either the heating or the cooling step since it will be inconvenient to incorporate it into the paste.

As previously indicated, the molecularly distilled monoglyceride must not only be provided in a form in which it will effectively enter the system, but it must be used apart from any fat or shortening. In other words, the molecularly distilled monoglyceride should be given an opportunity to combine with the amylose or perhaps the amylopectin component of the starch prior to the addition of any fatty ingredient. It is generally desirable that the monoglyceride emulsion be added at the sponge stage and that the shortening be added at the dough stage. Preferably, the emulsion of the invention is added at the beginning of the sponge and dough stages and in the same proportions of its total as the flour is used to its total in each stage and the shortening held until the end of the dough stage mix. This will expose all of the flour to preferential monoglyceride treatment before the flour is exposed to shortening. The amount of the emulsion employed in baked goods containing shortening depends upon the type, that is whether it is added to bread, sweet goods, cakes, cookies, or pies, etc. Usually the dough contains .25 to 10 percent based on the flour of the semi-liquid emulsion containing 15 to 60 percent molecularly distilled monoglyceride.

Several examples will best illustrate the effect of adding the molecularly distilled monoglyceride composition of the invention to flour prior to exposing the amylose and possibly some of the amylopectin component of the flour to shortening.

EXAMPLE 1

To prepare a monoglyceride emulsion, 100 parts of molecularly distilled monoglyceride prepared from hydrogenated lard and 199 parts of water are carefully heated to 150° F. in a vessel adapted to provide for uniform application of heat without localized overheating. During the heating stage, the water-monoglyceride mixture is constantly agitated. When the temperature reaches 150° F. the heating means are withdrawn and the mixture is permitted to gradually cool. One part of sodium propionate is added during this cooling stage, the mixture being continuously agitated until the temperature reaches 76° F.

EXAMPLE 2

In accordance with the procedure of Example 1 a similar emulsion was made using a molecularly distilled monoglyceride of hydrogenated tallow.

EXAMPLE 3

Following the procedure of Example 1 a semi-fluid emulsion was made using a molecularly distilled monoglyceride obtained from hydrogenated cottonseed oil.

Using the sponge dough method and variations in amounts of glyceride and shortening, and in types of glycerides as set forth in the examples which follow, bread was made from the following basic commercial bread formula.

*Basic Commercial Bread Formula*

|  | Percent on flour basis | |
|---|---|---|
|  | Sponge | Dough |
| Flour | 65.0 | 35.0 |
| Water | 56.0 | 65.0 |
| Yeast | 2.5 |  |
| Mineral Yeast Food | 5.0 |  |
| Salt |  | 2.25 |
| Sugar |  | 7.5 |
| Milk |  | 3.0 |
| Enr. Tablets | 1 |  |
| Lard & Glycerides | As in examples |  |

Sponge Temperature: 76° F.
Dough Temperature: 78° F.
Fermentation: 4 hrs. 30 min.
Floor Time: 30 minutes.
Mixing: 5 min. at 65 r.p.m.
Mixing: 5 min. at 65 r.p.m. after clean up.

By the use of the above bread formula, three bread doughs, A, B, and C, were made in each instance. In type A, the glyceride and all of the shortening were both added to the sponge. In type B, the glyceride and the shortening were both added to the dough. In type C, the glyceride was added to the sponge but all of the shortening was added to the dough. Bread made from each of these three doughs was tested for softness, keeping quality and generally accepted characteristics of good bread after the first and second and third days.

EXAMPLE 4

By the basic bread formula and .5 part of the composition of Example 1, type A, B, and C breads were made. In each case, the sponge ingredients were mixed in the sponge stage and allowed to ferment until a proper degree of maturity was indicated, about 4 hours and 30 minutes at 76° F. The sponge was then put in a mixer and the doughing ingredients added, that is the remaining ingredients called for in the basic formula. This dough was then permitted to ferment for 30 minutes at 78° F. The dough was then divided, rounded, molded, placed in the baking pans and baked at a temperature of 400 to 425° F. The type C bread in which the monoglyceride was added apart from the shortening was much better than types A and B in both texture and grain. The softnes of type C was only slightly better at the end of 12 hours. However, a marked improvement in staleness was evident as determined by odor and texture evaluation at the end of 12 hours. At the end of two days the softness and keeping quality was 10 to 30 percent better than types A and B. Similar results were obtained using .75 part of the composition of Example 1 in A, B and C type breads.

EXAMPLE 5

Following the baking procedure of Example 4, type

A, B, and C breads were made using .75 part of a mixture of mono-, di- and tri-glycerides prepared from lard containing 42 percent alpha monoglyceride. No appreciable difference was observed between the types A, B and C prepared according to this example. All three types became firm during the first 12 hours. At the end of three days, these three types were compared with the type C of Example 4 wherein .75 part monoglyceride was exposed to the flour prior to the addition of shortening. The three types prepared in accordance with this example were 20 to 30 percent more firm than those of type C of Example 4.

EXAMPLE 6

Following Example 4, type A, B and C breads were made using .5 part of a mixture of mono- and triglycerides containing 60 percent alpha monoglycerides. Again no difference was observed between the types A, B and C prepared according to this example. At the end of three days, these three types were also compared with type C of Example 4 wherein the monoglyceride was exposed to the flour prior to the addition of shortening. The three types prepared in accordance with this example were 10 to 20 percent more firm than those of type C, of Example 4.

EXAMPLE 7

In accordance with Example 4, type A, B and C breads were made using 2.5 parts of a powdered mixture of mono-, di- and triglycerides containing 8 percent alpha monoglyceride on a flour base. Types A, B and C prepared according to this example were all about the same firmness after 12 hours. At the end of three days, these three types were compared with type C of Example 4 wherein .75 part of monoglyceride was exposed to the flour prior to the addition of shortening. The three types prepared in accordance with this example were 30 to 50 percent more firm than those of type C, prepared according to Example 4 and containing .75 part monoglyceride.

EXAMPLE 8

Similar experiments were run using the preparation described in Example 2, comparing the bread produced, (1) with that made with an equal amount (.75 part) of the commercial mono, di, and triglyceride of Example 5, (2) with that made with an equal amount (.5 part) of the mono and triglyceride mixture of Example 6, and, (3) using .75 part of the emulsion of Example 2 with that made with 2.5 percent of the powdered mono-, di-, and triglyceride described in Example 7.

In all cases the type C bread made with the emulsion of Example 2 was appreciably softer at the end of three days.

EXAMPLE 9

Similar experiments were run using the preparation described in Example 3, comparing the bread produced, (1) with that made with an equal amount (.75 part) of the commercial mono, di, and triglyceride of Example 5, (2) with that made with an equal amount (.5 part) of the mono and triglyceride mixture of Example 6, and, (3) using .75 part of the emulsion of Example 3 with that made with 2.5 percent of the powdered mono-, di-, and triglyceride described in Example 7.

In all cases the type C bread made with the emulsion of Example 3 was noticeably softer at the end of three days and had improved grain and texture.

While the molecularly distilled monoglyceride of hydrogenated lard, tallow, and cottonseed oil were employed in the foregoing examples, it is understood that any edible monoglyceride can be used. Included are monoglycerides obtained by molecularly distilling such oils as castor oil, coconut oil, cod liver oil, corn oil, cotton seed oil, linseed oil, olive oil, palm oil, peanut oil, poppy seed oil, soybean oil, rice bran oil, fish oil, lard, mutton tallow, beef tallow, butterfat and the like, either as such or partially or completely hydrogenated. In other words, this invention contemplates monoesters wherein the mol of glycerol has been reacted with one mol of a saturated or unsaturated fatty acid having more than ten carbon atoms such as caproic, capric, lauric, myristic, palmitic, stearic, myristoleic, palmitoleic, oleic, erucic, hexadecatrienoic, pentaenoic, etc. It is thus obvious that while more monoglycerides will be obtained from natural sources, mixtures obtained synthetically can be molecularly distilled to provide a suitable monoglyceride.

It is obvious that modifications or variations can be made in accordance with this invention without departing from the spirit thereof. Thus in addition to pies and cookies the anti-staling agent contemplated herein can be added to chemically leavened products as well as yeast raised baked goods. It has been pointed out that components to inhibit molding can be included in the composition. Other additives, for instance, calcium sulfate known to increase the rate of water absorption by the flour, and such other ingredients as calcium lactate, mono calcium phosphate, dicalcium phosphate, calcium carbonate and the like can also be used in small amounts, say less than one percent. Other ramifications will occur to one skilled in the art, and such variations are deemed to be within the scope of this invention.

What is claimed is:

1. A process for improving texture and freshness retention of baked food products which contain shortening comprising incorporating an aqueous emulsion of a molecularly distilled monoglyceride in the dough in a manner permitting it to contact the starch before the starch comes into contact with the shortening.

2. The process of claim 1 wherein the dough contains yeast.

3. The process of claim 1 wherein the dough contains a chemical leavening agent.

4. The process of claim 1 wherein the baked food product is bread.

5. A process for improving texture and freshness retention of bread made by the sponge dough method comprising adding to the water which is added to the flour at the sponge stage an aqueous emulsion of a molecularly distilled monoglyceride while withholding the shortening addition until the dough stage.

6. As an anti-staling ingredient for baked food products which contain shortening, for incorporation in the dough, a semi-liquid aqueous stable emulsion of a molecularly distilled edible saturated monoglyceride, the emulsion being devoid of fat and other emulsifying agents and containing 15 to 60 percent molecularly distilled monoglyceride in combination with 85 to 40 percent water, the emulsion being formed by heating the monoglyceride mixed with the water to about 148° F. to 155° F. and not exceeding about 155° F. and gradually cooling the emulsion with substantially continuous agitation to room temperature.

References Cited in the file of this patent

UNITED STATES PATENTS 2,932,574    Bour    Apr. 12, 1960

FOREIGN PATENTS 691,401    Great Britain    May 13, 1953

OTHER REFERENCES

"Cereal Chemistry," September 1949, pages 348, 351.
"The Journal of the American Oil Chemists' Society," January 1958, page 49. (Copy in Division 63.)